US012293884B2

(12) United States Patent
Xu et al.

(10) Patent No.: US 12,293,884 B2
(45) Date of Patent: May 6, 2025

(54) KEY ASSEMBLY AND KEYBOARD

(71) Applicant: Honor Device Co., Ltd., Shenzhen (CN)

(72) Inventors: Huijie Xu, Shenzhen (CN); Haitao Li, Shenzhen (CN); Pingping Lei, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/249,329

(22) PCT Filed: Aug. 19, 2022

(86) PCT No.: PCT/CN2022/113753
§ 371 (c)(1),
(2) Date: Apr. 17, 2023

(87) PCT Pub. No.: WO2023/116002
PCT Pub. Date: Jun. 29, 2023

(65) Prior Publication Data

US 2024/0371583 A1 Nov. 7, 2024

(30) Foreign Application Priority Data

Dec. 24, 2021 (CN) ......................... 202111599799.7

(51) Int. Cl.
*H01H 13/85* (2006.01)
*H01H 13/7065* (2006.01)
*H01H 13/83* (2006.01)

(52) U.S. Cl.
CPC ........ *H01H 13/85* (2013.01); *H01H 13/7065* (2013.01); *H01H 13/83* (2013.01); *H01H 2209/01* (2013.01); *H01H 2221/044* (2013.01)

(58) Field of Classification Search
CPC ........... H01H 2009/16; H01H 2009/18; H01H 2009/182; H01H 2009/186;
(Continued)

(56) References Cited

U.S. PATENT DOCUMENTS

| | | | |
|---|---|---|---|
| 8,222,545 B2 | 7/2012 | Tsai | |
| 10,971,315 B2 | 4/2021 | Hsu et al. | |
| 11,158,469 B2 | 10/2021 | Shao et al. | |
| 11,830,683 B2 * | 11/2023 | Liao | H01H 13/7073 |
| 2016/0329166 A1 | 11/2016 | Hou et al. | |
| 2018/0025859 A1 | 1/2018 | Chen | |
| 2019/0287744 A1 | 9/2019 | Wu et al. | |

FOREIGN PATENT DOCUMENTS

| | | |
|---|---|---|
| CN | 204792561 U | 11/2015 |
| CN | 107643830 A | 1/2018 |

(Continued)

OTHER PUBLICATIONS

CN213752463U—English Machine Translation.*

*Primary Examiner* — Anthony R Jimenez
(74) *Attorney, Agent, or Firm* — Slater Matsil, LLP

(57) ABSTRACT

A key assembly, which includes a support plate, a flexible circuit board, a buffer block, and a pressing assembly. The support plate has a first surface and a second surface that are opposite to each other. The support plate has an accommodating portion that is recessed from the first surface to a side of the second surface, and the accommodating portion limits an accommodating groove. The flexible circuit board is superposed on the first surface, and the flexible circuit board has a through hole that is correspondingly connected to the accommodating groove. The buffer block is disposed in the accommodating groove, and passes through the through hole. The buffer block has a buffer support surface that protrudes from the flexible circuit board away from one side surface of the support plate. The pressing assembly includes a keycap, a support mechanism, and a connecting rod.

18 Claims, 5 Drawing Sheets

(58) Field of Classification Search
CPC ........... H01H 2013/00; H01H 2013/02; H01H 2013/023; H01H 2013/50; H01H 2013/52; H01H 2203/052; H01H 2209/01; H01H 2219/014; H01H 2219/018; H01H 2219/036; H01H 2219/046; H01H 2219/054; H01H 2219/062; H01H 2221/044; H01H 2239/006; H01H 13/00; H01H 13/12; H01H 13/14; H01H 13/50; H01H 13/52; H01H 13/70; H01H 13/702; H01H 13/704; H01H 13/705; H01H 13/7065; H01H 13/83; H01H 13/85; H01H 2003/12
USPC .......................................................... 200/521
See application file for complete search history.

(56) References Cited

FOREIGN PATENT DOCUMENTS

| | | | |
|---|---|---|---|
| CN | 107887212 | A | 4/2018 |
| CN | 108227942 | A | 6/2018 |
| CN | 108933054 | A | 12/2018 |
| CN | 110391106 | A | 10/2019 |
| CN | 209571350 | U | 11/2019 |
| CN | 111077956 | A | 4/2020 |
| CN | 111508754 | A | 8/2020 |
| CN | 111584279 | A | 8/2020 |
| CN | 211319988 | U | 8/2020 |
| CN | 112071687 | A | 12/2020 |
| CN | 213752463 | U | 7/2021 |
| CN | 113707482 | A | 11/2021 |

* cited by examiner

KEY ASSEMBLY AND KEYBOARD

CROSS-REFERENCE TO RELATED APPLICATIONS

This application is a national stage of International Application No. PCT/CN2022/113753, filed on Aug. 19, 2022, which claims priority to Chinese Patent Application No. 202111599799.7, filed on Dec. 24, 2021. The disclosures of both of the aforementioned applications are hereby incorporated by reference in their entireties.

TECHNICAL FIELD

This application relates to the field of a key structure, and in particular, to a key assembly and a keyboard.

BACKGROUND

A connecting rod made of a metal rod or the like is disposed on an inner side of a keycap of some keyboards, so as to strengthen structural rigidity of the keycap or implement a length-direction linkage or the like of a relatively long keycap.

However, in a known technology, pressing a keycap causes a connecting rod to impact or rub a flexible circuit board or a support base plate under a key, and consequently relatively loud noise is generated.

SUMMARY

This application provides a key assembly and a keyboard, so as to resolve a problem of relatively loud key noise in a known technology.

According to a first aspect, an embodiment of this application provides a key assembly, including a support plate, a flexible circuit board, a buffer block, and a pressing assembly. The support plate has a first surface and a second surface that are opposite to each other. The support plate has an accommodating portion that is recessed from the first surface to a side of the second surface, and the accommodating portion limits an accommodating groove. The flexible circuit board is superposed on the first surface, and the flexible circuit board has a through hole that is correspondingly connected to the accommodating groove. The buffer block is disposed in the accommodating groove, and passes through the through hole. The buffer block has a buffer support surface that protrudes from the flexible circuit board away from one side surface of the support plate. The pressing assembly includes a keycap, a support mechanism, and a connecting rod. The keycap is movably supported on the support plate by using the support mechanism, so that the keycap can be pressed or rebound. The connecting rod is connected to the keycap, and at least a part of the connecting rod corresponds to the buffer block.

In the key assembly in this embodiment of this application, after a keycap is pressed, a connecting rod that goes down with the keycap is first in contact with a buffer support surface of a buffer block, and is buffered and decelerated by the buffer block, so that the connecting rod does not directly collide with a flexible circuit board and a support plate, thereby reducing noise. After the keycap is released, the buffer block can provide the connecting rod with an additional rebound force, which facilitates fast rebound of the keycap. In addition, an accommodating portion formed by a recessed support plate may accommodate a buffer block with a relatively large thickness, which has a good buffer effect and has little impact on a travel distance of the keycap.

In a possible implementation, the key assembly further includes a backlight assembly, and the backlight assembly is superposed on the second surface of the support plate. The backlight assembly has a pocket hole, where the pocket hole corresponds to the accommodating portion, and the accommodating portion is at least partially accommodated in the pocket hole.

In this implementation, a recessed accommodating portion is accommodated in the pocket hole, so as to avoid an increased thickness of an entire structure due to the accommodating portion.

In a possible implementation, a thickness of the buffer block is 0.5-0.8 mm, and a height of the buffer support surface of that the buffer block protrudes from the flexible circuit board away from one side surface of the support plate is ¼-⅓ of the thickness of the buffer block.

In this implementation, a thickness that the buffer block protrudes from the flexible circuit board is only ¼-⅓ of a total thickness of the buffer block, which has little impact on a travel distance of a key. In addition, some buffer deformations may occur to the buffer block, so that the impact of the buffer block on the travel distance of the key is further reduced, and even in some cases, the travel distance of the key is not affected at all. For example, when a buffer block with relatively high flexibility is used, and a compression amount of the buffer block in a process of pressing down a key reaches a protrusion thickness of the buffer block, an overall travel distance of the key is the same as that when no buffer block is disposed.

In a possible implementation, the keycap is a long keycap, and a length of the keycap is greater than a width of the keycap. The pressing assembly includes two support mechanisms, and the two support mechanisms are respectively supported near two ends of the keycap along a length direction. The connecting rod includes a reinforcing rod and two linkage rods, and the two linkage rods are mirror-symmetrically disposed along a width-direction middle surface of the keycap. The linkage rod includes a cross bar segment and two rotary arm segments formed through bending and extending from two ends of the cross bar segment, and the cross bar segment rotatably cooperates with the support plate by using the two rotary arm segments. The reinforcing rod overall extends along a length direction of the keycap, and is fixedly connected to one side surface of the keycap facing the flexible circuit board. The buffer block includes four first buffer blocks and two second buffer blocks. The accommodating portion of the support plate includes four first accommodating portions and two second accommodating portions, where the four first accommodating portions are configured to correspondingly accommodate the four first buffer blocks, and the two second accommodating portions are configured to correspondingly accommodate the two second accommodating portions. The four first buffer blocks are rectangularly distributed at positions near corresponding four corners of the keycap, the two second buffer blocks are disposed at intervals along a direction parallel to the length of the keycap, and along a length direction of the keycap, the two second buffer blocks are located between the first buffer blocks. The second buffer block is a strip-shaped structure that extends along a width direction of the keycap. Installation spaces are limited between edges defined by the two second buffer blocks and the two first buffer blocks that are respectively adjacent to the two second buffer blocks in the length direction of the keycap, and the two support mechanisms are respectively located in the two installation spaces. The four first buffer blocks respectively correspond to four bending portions, and the bending portion refers to a part of rod segments that are bent opposite to each other at a joint between the cross bar segment and the rotary arm segment. A projection of the reinforcing rod on the first surface is located on an inner side of a rectangle enclosed by the four first buffer blocks. Two second buffer blocks respectively correspond to two ends of the reinforcing rod along a length direction, and extend along a width direction parallel to the keycap to a position corresponding to a lower part of the cross bar segment.

In this implementation, for a long keycap such as a space key of a keyboard, rigid linkage of the long keycap is implemented by using a linkage rod, and rigidity of the long keycap with a relatively small wall thickness is reinforced by using a reinforcing rod, and buffering when pressing and a rebound after the pressing of the linkage rod and the reinforcing rod are implemented by using the four first buffer blocks and the two second buffer blocks, which can effectively reduce key noise and increase rebound time, and can improve user experience.

In a possible implementation, a height that the second buffer block protrudes from the flexible circuit board is equal to a height that the first buffer block protrudes from the flexible circuit board, so that when the keycap is pressed, contact between the linkage rod and the first buffer block and the second buffer block is synchronous with contact between the reinforcing rod and the second buffer block.

In this implementation, a protrusion height of the first buffer block is equal to that of the second buffer block, so that when a key is pressed, four bending portions of the linkage rod are in contact with four corresponding first buffer blocks, a long rod segment of the linkage rod is in contact with the second buffer block, and at the same time, the reinforcing rod is in contact with the second buffer block. Therefore, reliable buffering can be obtained everywhere, and noise generated by collision or friction everywhere may be reduced to a maximum extent. Based on this structure, the long keycap can be evenly pressed and rebound wherever a pressing position is on a long keyboard, which can bring good hand feel in use.

In another possible implementation, the height that the second buffer block protrudes from the flexible circuit board is less than the height that the first buffer block protrudes from the flexible circuit board, so that when the keycap is pressed, contact between the linkage rod and the first buffer block is prior to contact between the reinforcing rod and the second buffer block.

In this implementation, when the key is pressed, the keycap is buffered by two levels. The first level buffer is buffering of the first buffer block against the linkage rod, and the second level buffer is the first level buffer plus buffering of the second buffer block against the linkage rod and the reinforcing rod, so as to form buffering with increased strength and have better hand feel in use. In addition, that the linkage rod is first in contact with the first buffer block can ensure that a key of the long keycap is smooth. There will be no upwarp on one side of the long keycap, which is more likely to occur when the second buffer block at a middle position of the long keycap along a length direction is first in contact with the reinforcing rod.

Optionally, a recessed depth of the first accommodating portion is less than a recessed depth of the second accommodating portion, and/or a thickness of the first buffer block is greater than a thickness of the second buffer block.

In this implementation, a protrusion height of the second buffer block may be less than that of the first buffer block in the two manners of disposing a second accommodating portion that is more deeply recessed or a second buffer block with a smaller thickness, which may be specifically selected based on an actual situation.

In a possible implementation, the connecting rod includes two linkage rods, and the two linkage rods are mirror-symmetrically disposed along a width-direction middle surface of the keycap. The linkage rod includes a cross bar segment and two rotary arm segments formed through bending and extending from two ends of the cross bar segment, and the cross bar segment rotatably cooperates with the support plate by using the two rotary arm segments. The buffer block includes four first buffer blocks, the four first buffer blocks are rectangularly distributed, the four first buffer blocks respectively correspond to four bending portions, and the bending portion refers to a part of rod segments that are bent opposite to each other at a joint between the cross bar segment and the rotary arm segment.

In this implementation, the linkage rod can enable the keyboard to be pressed smoothly or the keycap to be rigidly linked in the length direction, so as to ensure hand feel of a key. The four first buffer blocks are disposed, so that the four bending portions of the linkage rod are first in contact with the buffer blocks, thereby reducing noise generated when the linkage rod directly impacts or rubs a flexible circuit board or a support plate. In addition, the four bending portions are respectively supported on the four first buffer blocks at four corners, so that support stability can be maintained, and when the keycap is pressed in place, the keycap is pressed smoothly without upwarp on one side.

In a possible implementation, the connecting rod further includes a reinforcing rod, and the reinforcing rod overall extends along the length direction of the keycap, and is fixedly connected to one side surface of the keycap facing the flexible circuit board. The projection of the reinforcing rod on the first surface is located on the inner side of the rectangle enclosed by the four first buffer blocks. The buffer block further includes two second buffer blocks. The two second buffer blocks are disposed at intervals from each other along the length direction of the keycap, and respectively correspond to the two ends of the reinforcing rod along a length direction. The second buffer block extends along a width direction parallel to the keycap to a position corresponding to a lower part of the cross bar segment.

In this implementation, the reinforcing rod is configured to strengthen rigidity of the keycap, and is suitable for a keycap with a relatively small wall thickness. The second buffer block is disposed, which can buffer the reinforcing rod, to reduce noise generated when the reinforcing rod directly collides with a flexible circuit board or a support plate, and at the same time, can alternatively assist in supporting and buffering the cross bar segment of the linkage rod. After key pressing is finished and the keycap is released, the four first buffer blocks and the two second buffer blocks apply an additional rebound force to the linkage rod and the reinforcing rod at each position, which facilitates a fast and smooth rebound of the keycap.

In a possible implementation, the buffer block is made of silica gel or a rubber material.

In this implementation, the buffer block may be made of silica gel, rubber, or another elastic material.

In a possible implementation, the support mechanism is a scissor foot mechanism; a third buffer block is disposed between the support mechanism and the flexible circuit board; and a fourth buffer block is disposed at a position where the keycap corresponds to the support mechanism.

In this implementation, the third buffer block and the fourth buffer block are disposed, so that noise between the keycap and the support mechanism and noise between the support mechanism and the flexible circuit board can be reduced when a key is pressed.

According to a second aspect, an embodiment of this application provides a keyboard, including a housing and the foregoing key assembly. The housing is enclosed into an internal space, and a keyhole is disposed on the housing. The key assembly is installed in the internal space, and a keycap protrudes out of the internal space through the keyhole.

In this embodiment of this application, the keyboard uses the foregoing pressing assembly, and key noise is relatively small when the keyboard is being used.

BRIEF DESCRIPTION OF THE DRAWINGS

To describe technical solutions in embodiments of this application more clearly, the following briefly describes accompanying drawings in embodiments. It should be understood that the following accompanying drawings show only some embodiments of this application. Therefore, the following accompanying drawings should not be considered as a limitation on a scope. A person of ordinary skill in the art may still derive other related drawings from these accompanying drawings without creative efforts.

DESCRIPTION OF REFERENCE SIGNS OF MAIN COMPONENTS

Figure 1:
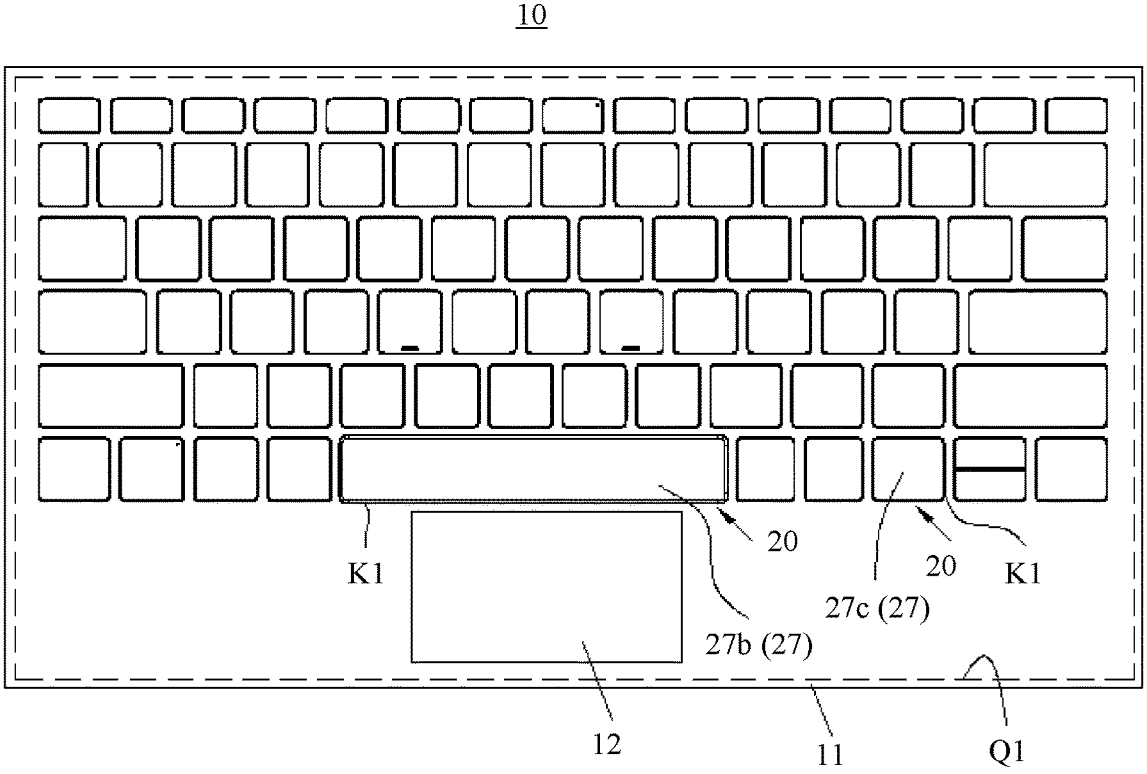
FIG. 1 is a schematic diagram of a structure of a keyboard according to an embodiment of this application.
Figure 2:
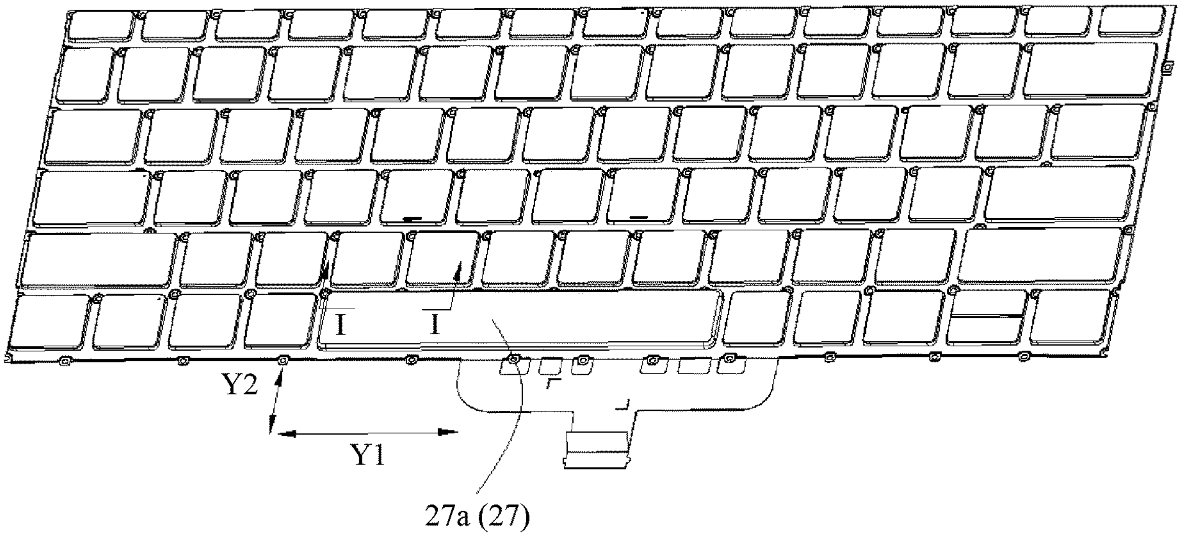
FIG. 2 is a partial structural view of the keyboard of FIG. 1.
Figure 3:
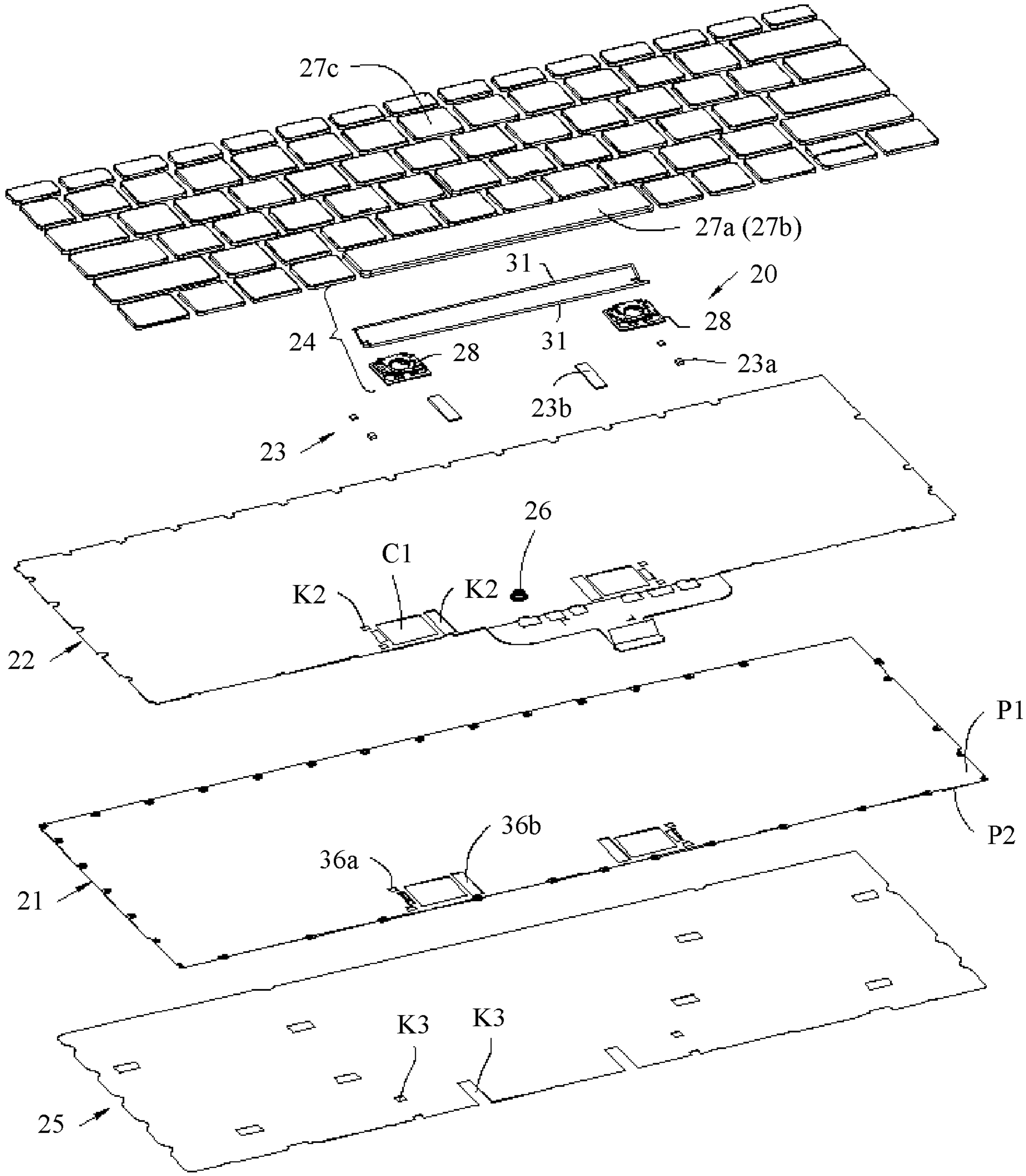
FIG. 3 is an expanded schematic diagram of FIG. 2.
Figure 4:
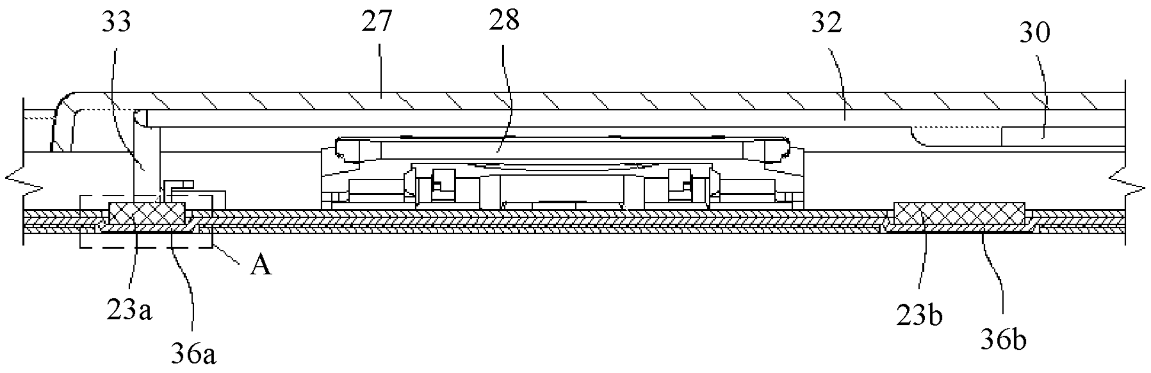
FIG. 4 is a sectional view along line I-I of FIG. 2.

Keyboard 10
Housing 11
Touchpad 12
Key assembly 20
Support plate 21
Flexible circuit board 22
Buffer block 23
First buffer block **23*a***
Second buffer block **23*b***
Pressing assembly 24
Backlight assembly 25
Trigger 26
Keycap 27
Space key **27*a***
Long keycap **27*b***
Common keycap **27*c***
Support mechanism 28
Connecting rod 29
Reinforcing rod 30
Linkage rod 31
Cross bar segment 32
Rotary arm segment 33
Installation block 34
Rotary arm 35
Accommodating portion 36
First accommodating portion **36*a***
Second accommodating portion **36*b***
Bending portion 37
Third buffer block 38
Fourth buffer block 39
Matching groove C1
Groove C2
Accommodating groove C3
Keyhole K1
Through hole K2
Pocket hole K3
First surface P1
Second surface P2
Buffer support surface P3
Internal space Q1
Installation space Q2
Blank area S1
Length direction Y1
Width direction Y2

DETAILED DESCRIPTION OF ILLUSTRATIVE EMBODIMENTS

The following clearly and fully describes technical solutions in embodiments of this application with reference to accompanying drawings in embodiments of this application. Apparently, the described embodiments are only some rather than all of the embodiments of this application.

It should be noted that when an element is referred to as being "fastened" to another element, it may be directly on another element, or a centered element may exist. When one element is considered to be "connected to" another element, it may be directly connected to another element, or a centered element may exist at the same time. When one element is considered to be "disposed" on another element, it may be directly disposed on another element, or a centered element may exist at the same time. The terms "vertical", "horizontal", "left", "right", and similar expressions are used herein for illustrative purposes only.

Unless otherwise defined, all technical and scientific terms used in this specification have the same meaning as those commonly understood by a person skilled in the art of this application. The terms used in the specification of this application are merely intended to describe specific implementations, and are not intended to limit this application. The term "or/and" as used herein includes any and all combinations of one or more associated listed items.

Some implementations of this application are described in detail. If there is no conflict, the following implementations and the features in the implementations may be mutually combined.

This embodiment provides a keyboard, which may be a thin-film keyboard or another keyboard, and may be a keyboard that can be used independently or a keyboard attached to integrated equipment such as a laptop computer.

Referring to FIG. 1, the keyboard 10 in this embodiment includes a housing 11 and several key assemblies 20 installed on the housing 11. A user can input information by pressing the key assembly 20. A quantity and a layout manner of the key assemblies 20 may be arranged in forms of 79 keys, 83 keys, 87 keys, 93 keys, 96 keys, 101 keys, 102 keys, 104 keys, 107 keys, and the like of a common keyboard. In this embodiment, keys of the keyboard 10 include several common keycaps **27*c* whose length and width are basically equal, and several long keycaps 27*b*** whose length is greater than width. A typical long keycap 27*b* mainly includes a space key 27*a*. A length-to-width ratio of the space key 27*a* may sometimes reach about 6.

In some implementations, the keyboard 10 further includes a touchpad 12, configured to replace a common mouse. The touchpad 12 has an existing structure, and details are not described herein again.

In this embodiment, the housing 11 is enclosed into an internal space Q1, key holes K1 whose quantity is the same as a quantity of keys are disposed on the housing 11, and each key hole K1 is connected to the internal space Q1 of the housing 11, which is configured to expose the key assembly 20.

Referring to FIG. 2 to FIG. 5, the key assembly 20 provided in an embodiment of this application includes a support plate 21, a flexible circuit board 22, a buffer block 23, and a pressing assembly 24. In some implementations, the key assembly 20 is further provided with a backlight assembly 25.

The support plate 21 has a first surface P1 and a second surface P2 that are opposite to each other. The flexible circuit board 22 is superposed on the first surface P1, and the backlight assembly 25 (if any) is superposed on the second surface P2 of the support plate 21. The backlight assembly 25, the support plate 21, and the flexible circuit board 22 may be disposed in the internal space Q1 of the housing 11 in a successively superposition manner. The support plate 21 may be made of a metal plate such as an aluminum plate, which can provide a specific bearing capacity and has a relatively high structural rigidity. The flexible circuit board 22 has a plurality of key-position contacts (not shown in the figure) that correspond to each pressing assembly 24 and a trigger 26, so that an action of pressing the pressing assembly 24 can enable the trigger 26 to be in contact with the key-position contacts, and the flexible circuit board 22 receives a mechanical signal and converts the mechanical signal into an input electrical signal. The flexible circuit board 22 may be electrically connected to a processor of a host such as a laptop computer by using an FPC (Flexible Printed Circuit, flexible printed circuit). The backlight assembly 25 is disposed on another side of the support plate 21, and is configured to provide backlight when required. In some implementations, the backlight assembly includes a backlight plate and a protection film.

The pressing assembly 24 includes a keycap 27, a support mechanism 28, and a connecting rod 29. The keycap 27 is movably supported on the support plate 21 by using the support mechanism 28, so that the keycap 27 can be pressed or rebound.

Figure 6:
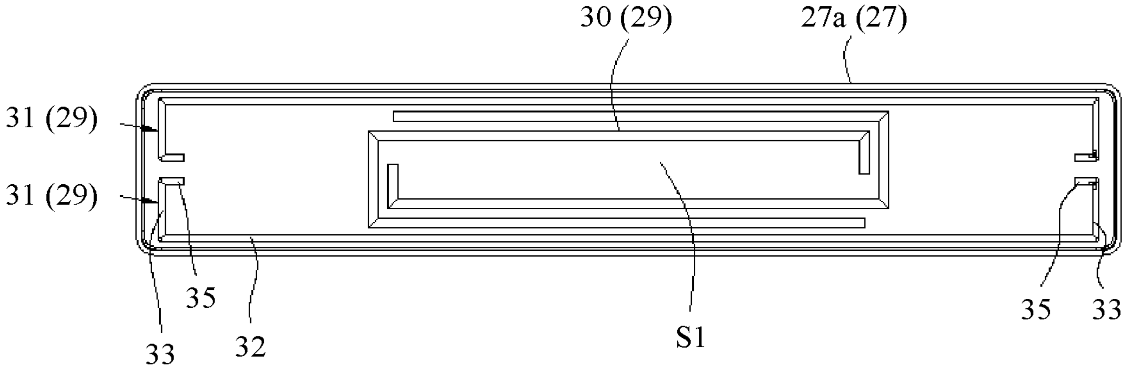
FIG. 6 is a schematic diagram of a cooperation relationship between a keycap and a connecting rod.

The keycap 27 may be a long keycap 27*b* such as a space key 27*a*, or may be a common keycap 27*c* whose length and width are similar. For some keyboards with a relatively small overall thickness, such as a keyboard that comes with a laptop computer, a long keycap 27*b* such as a space key 27*a* may have a relatively long length and a relatively small wall thickness. In this case, as shown in FIG. 6, a reinforcing rod 30 may be disposed on an inner side of the keycap 27 (facing one side of the support mechanism 28) to improve structural rigidity or strength of the keycap 27. In this embodiment, the reinforcing rod 30 overall extends along a length direction Y1 of the keycap 27, and is fixedly connected to one side surface of the keycap 27 facing the flexible circuit board 22 through bonding or clamping. Optionally, the reinforcing rod 30 is disposed in such a way that two rods bent into a U shape are spliced oppositely, and a blank area S1 is enclosed between the two rods, which is configured to correspond to the trigger 26, so that the trigger 26 directly corresponds to the keycap 27 and is not blocked by the reinforcing rod 30, thereby ensuring a travel distance of the trigger 26.

Figure 7:
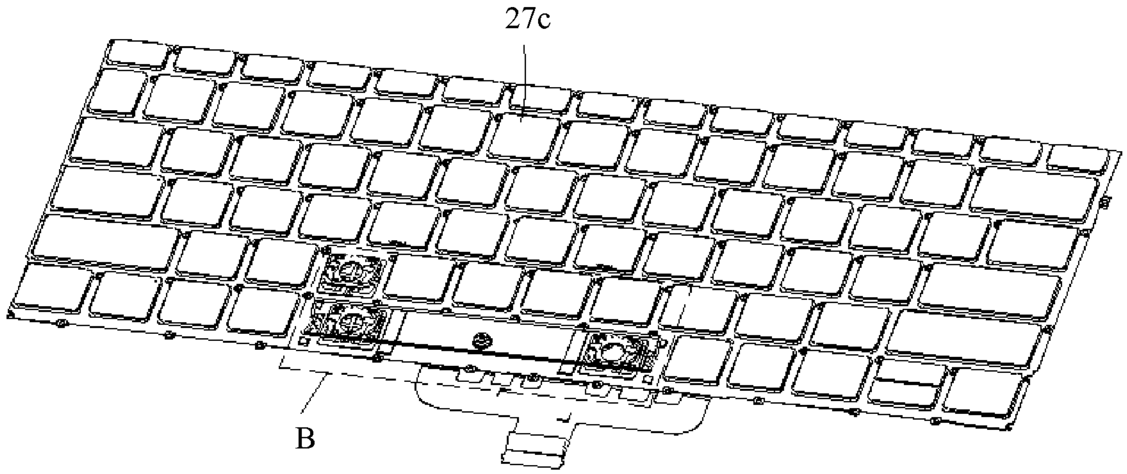
FIG. 7 is a schematic diagram after a space key and a common keycap in FIG. 2 are hidden.
Figure 8:
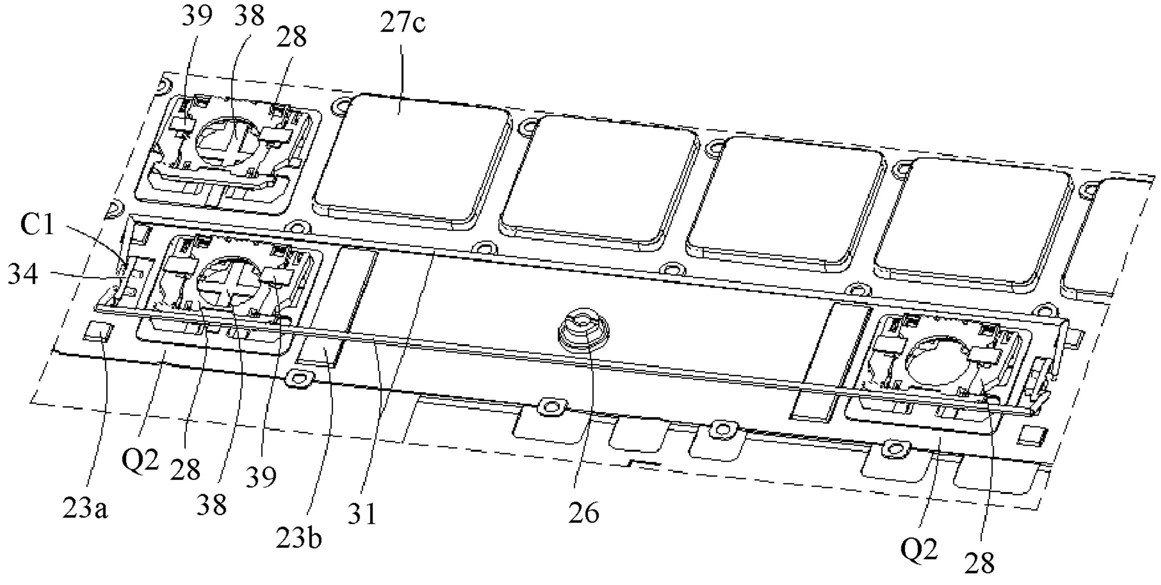
FIG. 8 is an enlarged view at position B of FIG. 7.

In addition to the reinforcing rod 30, some long keycaps 27*b* are further supported and connected to the support plate 21 by using a linkage rod 31, so as to implement a length-direction linkage of the long keycaps 27*b*, and avoid that when a pressing position is located at a length-direction end of the long keycaps 27*b*, asynchronously pressing down of long keycaps 27*b* along a length direction causes the long keycaps 27*b* to tilt down to affect hand feel of a key. In this embodiment, there are two linkage rods 31. The two linkage rods 31 are mirror-symmetrically disposed along a width-direction Y2 middle surface of the keycap 27. The linkage rod 31 includes a cross bar segment 32 and two rotary arm segments 33 formed through bending and extending from two ends of the cross bar segment 32. The cross bar segment 32 rotatably cooperates with the support plate 21 by using the two rotary arm segments 33. The cross bar segment 32 cooperates with the long keycap 27*b* to move close to one side of the support mechanism 28, and is rotatably connected to the long keycap 27*b*. For example, a buckle portion (not shown in the figure) may be disposed on the long keycap 27*b*, and the cross bar segment 32 is rotatably clamped in the buckle portion. A rotatable cooperation structure of the rotary arm segment 33 on the support plate 21 may be disposed as required. For example, referring to FIG. 7 and FIG. 8, an installation block 34 that protrudes from a board on the support plate 21 is disposed, a matching groove C1 is disposed on the installation block 34, and an end of the rotary arm segment 33 is bent to form a rotary arm 35 to be rotatably cooperate with the matching groove C1. In this way, when the keycap 27 is pressed, the linkage rod 31 can rotate relative to the keycap 27 and the support plate 21 when supporting the keycap 27 along a length direction.

The connecting rod 29 in this embodiment may include the foregoing linkage rod 31 and the reinforcing rod 30, or may be one of the foregoing linkage rod 31 and the reinforcing rod 30.

For a long keycap 27*b* such as a space key 27*a*, two support mechanisms 28 of the pressing assembly 24 may be disposed, and the two support mechanisms 28 are respectively supported near two ends of the keycap 27 along a length direction Y1. In this embodiment, the support mechanism 28 uses a scissor foot structure, and a travel distance of a key of the support mechanism 28 is relatively short, for example, may be up to 1.8-2.0 mm, which is particularly applicable to a laptop computer keyboard or some thin-film keyboards.

Figure 9:
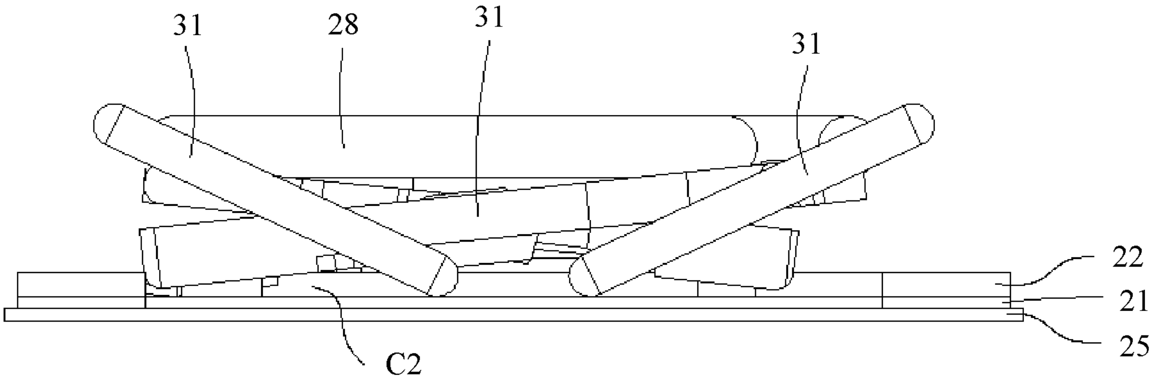
FIG. 9 is a side view after a keycap in a key assembly corresponding to a space key is hidden.

In this embodiment, referring to FIG. 9, a groove C2 is disposed on the flexible circuit board 22, which is configured to allow a connection portion of the support mechanism 28 to pass through, to support and connect to the support plate 21. Certainly, in some other embodiments, strength of a part of the flexible circuit board 22 may alternatively be set to be relatively high, so as to support and connect to the support mechanism 28.

Figure 5:
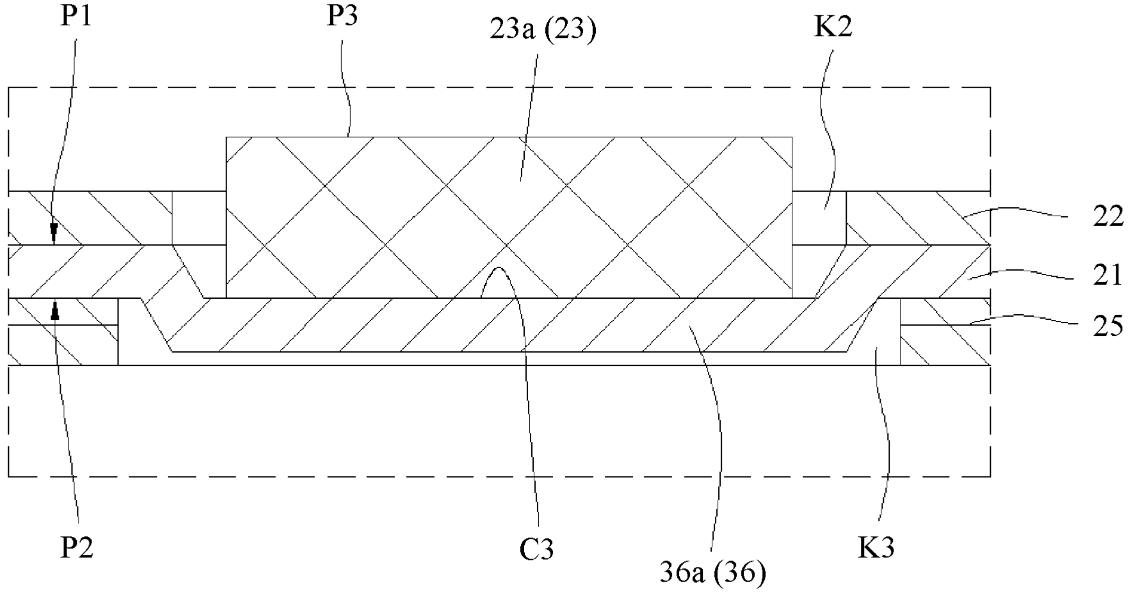
FIG. 5 is an enlarged view at position A of FIG. 4.

Referring mainly to FIG. 5, in this embodiment, the support plate 21 has an accommodating portion 36 that is recessed from the first surface P1 to the second surface P2, and the accommodating portion 36 limits an accommodating groove C3. The accommodating portion 36 in this embodiment may be a recessed structure formed through stamping on the support plate 21. The flexible circuit board 22 has a through hole K2 that is correspondingly connected to the accommodating groove C3. If the backlight assembly 25 is disposed, the backlight assembly 25 has a pocket hole K3 corresponding to the accommodating portion 36, and the accommodating portion 36 is at least partially accommodated in the pocket hole K3, so that the accommodating portion 36 that is recessed to a side of the backlight assembly 25 does not additionally increase a thickness of an entire structure.

The buffer block 23 is disposed in the accommodating groove C3, and passes through the through hole K2 of the flexible circuit board 22. The buffer block 23 has a buffer support surface P3 that protrudes from the flexible circuit board 22 away from one side surface of the support plate 21. In the key assembly 20 in this embodiment, after a keycap 27 is pressed, a connecting rod 29 that goes down with the keycap 27 is first in contact with a buffer support surface P3 of a buffer block 23, and is buffered and decelerated by the buffer block 23, so that the connecting rod 29 does not directly collide with a flexible circuit board 22 and a support plate 21, thereby reducing noise. After the keycap 27 is released, the buffer block 23 can provide the connecting rod 29 with an additional rebound force, which facilitates a fast rebound of the keycap 27. In addition, an accommodating portion 36 formed by a recessed support plate 21 may accommodate a buffer block 23 with a relatively large thickness, which has a good buffer effect and has little impact on a travel distance of the keycap 27.

With reference to the foregoing accompanying drawings, corresponding to the foregoing case in which the linkage rod 31 and the reinforcing rod 30 are disposed, the buffer block 23 in this embodiment includes four first buffer blocks 23*a* and two second buffer blocks 23*b*. Correspondingly, the accommodating portion 36 of the support plate 21 includes four first accommodating portions 36*a* and two second accommodating portions 36*b*, where the four first accommodating portions 36*a* are configured to correspondingly accommodate the four first buffer blocks 23*a*, and the two second accommodating portions 36*b* are configured to correspondingly accommodate the two second accommodating portions 36*b*. The four first buffer blocks 23*a* are rectangularly distributed at positions near corresponding four corners of the keycap 27, the two second buffer blocks 23*b* are disposed at intervals along a length direction Y1 parallel to the keycap 27, and along a length direction Y1 of the keycap 27, the two second buffer blocks 23*b* are located between the first buffer blocks 23*a*. The second buffer block 23*b* is a strip-shaped structure that extends along a width direction Y2 of the keycap 27. Installation spaces Q2 are limited between edges defined by the two second buffer blocks 23*b* and the two first buffer blocks 23*a* that are respectively adjacent to the two second buffer blocks 23*b* in the length direction Y1 of the keycap 27, and the two support mechanisms 28 are respectively located in the two installation spaces Q2. The four first buffer blocks 23*a* respectively correspond to four bending portions 37, and the bending portion 37 refers to a part of rod segments that are bent opposite to each other at a joint between the cross bar segment 32 and the rotary arm segment 33. A projection of the reinforcing rod 30 on the first surface P1 is located on an inner side of a rectangle enclosed by the four first buffer blocks 23*a*. Two second buffer blocks respectively correspond to two ends of the reinforcing rod 30 along a length direction, and extend along a width direction Y2 parallel to the keycap 27 to a position corresponding to a lower part of the cross bar segment 32. In this implementation, for a long keycap 27*b* such as a space key 27*a* of a keyboard 10, rigid linkage of the long keycap 27*b* is implemented by using a linkage rod 31 and rigidity of the long keycap 27*b* with a relatively small wall thickness is reinforced by using a reinforcing rod 30, and buffering when pressing and a rebound after the pressing is completed of the linkage rod 31 and the reinforcing rod 30 are implemented by using the four first buffer blocks 23*a* and the two second buffer blocks 23*b*, which can effectively reduce noise generated by that the linkage rod 31 or the reinforcing rod 30 directly impacts or rubs the flexible circuit board 22 and the support plate 21 when a key is pressed, can reduce rebound time, and can improve user experience.

The buffer block 23 (the first buffer block 23*a* and/or the second buffer block 23*b*) in this embodiment is made of silica gel, rubber, or another elastic material.

For some thin-film keyboards 10, a travel distance of a key of the thin-film keyboards 10 is approximately 1.8-2.0 mm. In this case, a thickness of the buffer block 23 (the first buffer block 23*a* and/or the second buffer block 23*b*) may be set to 0.5-0.8 mm, and a height of the buffer support surface P3 of the buffer block 23 that protrudes from the flexible circuit board 22 away from one side surface of the support plate 21 is ¼-⅓ of the thickness of the buffer block 23. The buffer block 23 with this thickness can provide proper buffer space and a rebound force. A ¼-⅓ protrusion thickness of the buffer block 23 can also be deformed by pressing down by the connecting rod 29 (the linkage rod 31 and/or the reinforcing rod 30) which is connected to the keycap 27 in the downward direction of the key, thereby further reducing or fully eliminating impact of a protrusion part on an overall travel distance of the key. For example, when a buffer block 23 with relatively high flexibility is used, and a compression amount of the buffer block 23 in a process of pressing down a key reaches a protrusion thickness of the buffer block 23, an overall travel distance of the key is the same as that when no buffer block 23 is disposed.

In some implementations of this embodiment, a height that the second buffer block 23*b* protrudes from the flexible circuit board 22 is equal to a height that the first buffer block 23*a* protrudes from the flexible circuit board 22, so that when the keycap 27 is pressed, contact between the linkage rod 31 and the first buffer block 23*a* and the second buffer block 23*b* is synchronous with contact between the reinforcing rod 30 and the second buffer block 23*b*. In this implementation, a protrusion height of the first buffer block 23*a* is equal to that of the second buffer block 23*b*, so that when a key is pressed, four bending portions 37 of the linkage rod 31 are in contact with four corresponding first buffer blocks 23*a*, a long rod segment of the linkage rod 31 is in contact with the second buffer block 23*b*, and the reinforcing rod 30 is in contact with the second buffer block 23*b* at the same time. Therefore, reliable buffering can be obtained everywhere, and noise generated by collision or friction everywhere may be reduced to a maximum extent. Based on this structure, the long keycap 27*b* can be evenly pressed and rebound wherever a pressing position is on the long keycap 27*b*, which can bring good hand feel in use.

In some other implementations, the height that the second buffer block 23*b* protrudes from the flexible circuit board 22 is less than the height that the first buffer block 23*a* protrudes from the flexible circuit board 22, so that when the keycap 27 is pressed, contact between the linkage rod 31 and the first buffer block 23*a* is prior to contact between the reinforcing rod 30 and the second buffer block 23*b*. In this implementation, when the key is pressed, the keycap 27 is buffered by two levels. The first level buffer is buffering of the first buffer block 23*a* against the linkage rod 31, and the second level buffer is the first level buffer plus buffering of the second buffer block 23*b* against the linkage rod 31 and the reinforcing rod 30, so as to form buffering with progressively increased strength and have better hand feel in use. In addition, that the linkage rod 31 is first in contact with the first buffer block 23*a* can ensure that a key of the long keycap 27*b* is smooth. There will be no upwarp on one side of the long keycap 27*b*, which is more likely to occur when the second buffer block 23*b* in a middle position of the keycap 27*b* along a length direction is first in contact with the reinforcing rod 30. In this implementation, optionally, a recessed depth of the first accommodating portion 36*a* is less than a recessed depth of the second accommodating portion 36*b*, and/or a thickness of the first buffer block 23*a* is greater than a thickness of the second buffer block 23*b*, so that a protrusion height of the second buffer block 23*b* is less than that of the first buffer block 23*a*.

In this embodiment, optionally, a third buffer block 38 is disposed between the support mechanism 28 and the flexible circuit board 22, and a fourth buffer block 39 is disposed between the keycap 27 and the support mechanism 28, so as to reduce noise between the keycap 27 and the support mechanism 28 and noise between the support mechanism 28 and the flexible circuit board 22 when the key is pressed. The fourth buffer block 39 may be fastened to a side of the keycap 27 corresponding to the support mechanism 28 through bonding or in another manner, or may be fastened to a surface of one side of the support mechanism 28 corresponding to the keycap 27. The third buffer block 38 may be attached to a surface of the flexible circuit board 22 and corresponds to the support mechanism 28. In this embodiment, the third buffer block 38 and the fourth buffer block 39 may be made of silica gel, rubber, or another elastic material.

In an embodiment of this application, the keyboard 10 includes a plurality of long keycaps 27*b* with a relatively large length-to-width ratio (for example, the length-to-width ratio is greater than 1.5) and a plurality of common keycaps 27*c*. The long keycap 27*b* includes a space key 27*a*, a backspace key, a CTRL key, and the like. The common keycap 27*c* includes letter keys, numeral keys, and the like. The long keycap 27*b* is disposed in a disposing manner of the foregoing key assembly 20; and for the common keycap 27*c*, only the foregoing third buffer block 38 and the fourth buffer block 39 need to be disposed among the keycap 27, the support mechanism 28, and the flexible circuit board 22 by referring to the foregoing manner. In this way, a keyboard whose key noise of each key can be effectively controlled is obtained, which is conducive to an environment in which a keyboard needs to be used quietly.

The foregoing implementations are merely used to describe the technical solutions of this application, but are not limited thereto. Although this application is described in detail with reference to the foregoing preferred implementations, persons of ordinary skill in the art should understand that modifications or equivalent replacements of the technical solutions of this application may be performed without departing from the spirit and scope of the technical solutions of this application.

What is claimed is:

1. A key assembly, comprising:

a support plate, wherein the support plate has a first surface and a second surface that are opposite to each other, the support plate has an accommodating portion, and the accommodating portion limits an accommodating groove, and wherein the first surface in the accommodating portion is level with the second surface outside of the accommodating portion;

a flexible circuit board, wherein the flexible circuit board is superposed on the first surface, and the flexible circuit board has a through hole that is correspondingly connected to the accommodating groove;

a buffer block, wherein the buffer block is disposed in the accommodating groove on the first surface, and the buffer block passes completely through the through hole of the flexible circuit board; and the buffer block has a buffer support surface that protrudes from the flexible circuit board; and a pressing assembly, wherein the pressing assembly comprises a keycap, a support mechanism, and a connecting rod, the keycap is movably supported on the support plate by using the support mechanism in a manner that the keycap is able to be pressed or rebound, and the connecting rod is connected to the keycap, and at least a part of the connecting rod corresponds to the buffer block.

2. The key assembly according to claim 1, wherein:

the key assembly further comprises a backlight assembly, and the backlight assembly is superposed on the second surface of the support plate; and the backlight assembly comprises a pocket hole, the pocket hole corresponds to the accommodating portion, and the accommodating portion is at least partially accommodated in the pocket hole.

3. The key assembly according to claim 1, wherein:

a thickness of the buffer block is 0.5-0.8 mm, and a height of the buffer support surface of the buffer block that protrudes from the flexible circuit board is ¼-⅓ of the thickness of the buffer block.

4. The key assembly according to claim 1, wherein:

the buffer block comprises silica gel or a rubber material.

5. The key assembly according to claim 1, wherein:

the support mechanism is a scissor foot mechanism; a third buffer block is disposed between the support mechanism and the flexible circuit board; and a fourth buffer block is disposed at a position where the keycap corresponds to the support mechanism.

6. The key assembly according to claim 1, wherein:

the keycap is a long keycap, and a length of the keycap is greater than a width of the keycap;

the pressing assembly comprises two support mechanisms, and the two support mechanisms are respectively supported near two ends of the keycap along a length direction; the connecting rod comprises a reinforcing rod and two linkage rods, and the two linkage rods are mirror-symmetrically disposed along a width-direction middle surface of the keycap; each linkage rod comprises a cross bar segment and two rotary arm segments formed through bending and extending from two ends of the cross bar segment, and the cross bar segment of each linkage rod rotatably cooperates with the support plate by using the corresponding two rotary arm segments; and the reinforcing rod overall extends along a length direction of the keycap, and is fixedly connected to one side surface of the keycap facing the flexible circuit board;

the buffer block comprises four first buffer blocks and two second buffer blocks; and the accommodating portion of the support plate comprises four first accommodating portions and two second accommodating portions, wherein the four first accommodating portions are configured to correspondingly accommodate the four first buffer blocks, and the two second accommodating portions are configured to correspondingly accommodate the two second accommodating portions;

the four first buffer blocks are rectangularly distributed at positions near corresponding four corners of the keycap, the two second buffer blocks are disposed at intervals along a direction parallel to the length of the keycap, and along a length direction of the keycap, the two second buffer blocks are located between the four first buffer blocks; and each second buffer block is a strip-shaped structure that extends along a width direction of the keycap;

installation spaces are limited between edges defined by the two second buffer blocks and two first buffer blocks that are respectively adjacent to the two second buffer blocks in the length direction of the keycap, and the two support mechanisms are respectively located in the installation spaces;

the four first buffer blocks respectively correspond to four bending portions, and each bending portion refers to a part of rod segments that are bent opposite to each other at a joint between the corresponding cross bar segment and the corresponding rotary arm segment; and a projection of the reinforcing rod on the first surface is located on an inner side of a rectangle enclosed by the four first buffer blocks; and the two second buffer blocks respectively correspond to two ends of the reinforcing rod along a length direction, and extend along a width direction parallel to the keycap to a position corresponding to a lower part of the corresponding cross bar segment.

7. The key assembly according to claim 6, wherein:

a height that at least one second buffer block protrudes from the flexible circuit board is equal to a height that at least one first buffer block protrudes from the flexible circuit board, so that when the keycap is pressed, contact between at least one linkage rod and the at least one first buffer block and the at least one second buffer block is synchronous with contact between the reinforcing rod and the at least one second buffer block.

8. The key assembly according to claim 1, wherein:

the connecting rod comprises two linkage rods, and the two linkage rods are mirror-symmetrically disposed along a width-direction middle surface of the keycap;

each linkage rod comprises a cross bar segment and two rotary arm segments formed through bending and extending from two ends of the cross bar segment, and the cross bar segment of each linkage rod rotatably cooperates with the support plate by using the corresponding two rotary arm segments; and the buffer block comprises four first buffer blocks, the four first buffer blocks are rectangularly distributed, the four first buffer blocks respectively correspond to four bending portions, and each bending portion is a part of rod segments that are bent opposite to each other at a joint between the corresponding cross bar segment and the corresponding rotary arm segment.

9. The key assembly according to claim 8, wherein:

the connecting rod further comprises a reinforcing rod, and the reinforcing rod overall extends along a length direction of the keycap, and is fixedly connected to one side surface of the keycap facing the flexible circuit board; and a projection of the reinforcing rod on a first surface is located on an inner side of a rectangle enclosed by the four first buffer blocks; and the buffer block further comprises two second buffer blocks, and the two second buffer blocks are disposed at intervals from each other along the length direction of the keycap, and respectively correspond to two ends of the reinforcing rod along a length direction; and each second buffer block extends along a width direction parallel to the keycap to a position corresponding to a lower part of the corresponding cross bar segment.

10. A keyboard, comprising:

a housing, wherein the housing surrounds an internal space, and a keyhole is disposed on the housing; and a key assembly, wherein the key assembly comprises a support plate, a flexible circuit board, a buffer block and a pressing assembly; the support plate has a first surface and a second surface that are opposite to each other, the support plate has an accommodating portion, and the accommodating portion limits an accommodating groove, and wherein the first surface in the accommodating portion is level with the second surface outside of the accommodating portion;

wherein the flexible circuit board is superposed on the first surface, and the flexible circuit board has a through hole that is correspondingly connected to the accommodating groove;

wherein the buffer block is disposed in the accommodating groove on the first surface, and passes completely through the through hole; and the buffer block has a buffer support surface that protrudes from the flexible circuit board;

wherein the pressing assembly comprises a keycap, a support mechanism, and a connecting rod; the keycap is movably supported on the support plate by using the support mechanism in a manner that the keycap is able to be pressed or rebound; and the connecting rod is connected to the keycap, and at least a part of the connecting rod corresponds to the buffer block; and wherein the key assembly is installed in the internal space, and the keycap protrudes out of the internal space through the keyhole.

11. The keyboard according to claim 10, wherein:

the key assembly further comprises a backlight assembly, and the backlight assembly is superposed on the second surface of the support plate; and the backlight assembly has a pocket hole, the pocket hole corresponds to the accommodating portion, and the accommodating portion is at least partially accommodated in the pocket hole.

12. The keyboard according to claim 10, wherein:

the buffer block comprises silica gel or a rubber material.

13. The keyboard according to claim 10, wherein:

the support mechanism is a scissor foot mechanism; a third buffer block is disposed between the support mechanism and the flexible circuit board; and a fourth buffer block is disposed at a position where the keycap corresponds to the support mechanism.

14. The keyboard according to claim 10, wherein:

a thickness of the buffer block is 0.5-0.8 mm, and a height of the buffer support surface of the buffer block that protrudes from the flexible circuit board is ¼-⅓ of the thickness of the buffer block.

15. The keyboard according to claim 10, wherein:

the keycap is a long keycap, and a length of the keycap is greater than a width of the keycap;

the pressing assembly comprises two support mechanisms, and the two support mechanisms are respectively supported near two ends of the keycap along a length direction; the connecting rod comprises a reinforcing rod and two linkage rods, and the two linkage rods are mirror-symmetrically disposed along a width-direction middle surface of the keycap; each linkage rod comprises a cross bar segment and two rotary arm segments formed through bending and extending from two ends of the cross bar segment, and the cross bar segment of each linkage rod rotatably cooperates with the support plate by using the corresponding two rotary arm segments; and the reinforcing rod overall extends along a length direction of the keycap, and is fixedly connected to one side surface of the keycap facing the flexible circuit board;

the buffer block comprises four first buffer blocks and two second buffer blocks; and the accommodating portion of the support plate comprises four first accommodating portions and two second accommodating portions, wherein the four first accommodating portions are configured to correspondingly accommodate the four first buffer blocks, and the two second accommodating portions are configured to correspondingly accommodate the two second accommodating portions;

the four first buffer blocks are rectangularly distributed at positions near corresponding four corners of the keycap, the two second buffer blocks are disposed at intervals along a direction parallel to the length of the keycap, and along the length direction of the keycap, the two second buffer blocks are located between the four first buffer blocks; and each second buffer block is a strip-shaped structure that extends along a width direction of the keycap;

installation spaces are limited between edges defined by the two second buffer blocks and two first buffer blocks that are respectively adjacent to the two second buffer blocks in the length direction of the keycap, and the two support mechanisms are respectively located in the installation spaces;

the four first buffer blocks respectively correspond to four bending portions, and each bending portion is a part of rod segments that are bent opposite to each other at a joint between the corresponding cross bar segment and the corresponding rotary arm segment; and a projection of the reinforcing rod on the first surface is located on an inner side of a rectangle enclosed by the four first buffer blocks; and the two second buffer blocks respectively correspond to two ends of the reinforcing rod along a length direction, and extend along a width direction parallel to the keycap to a position corresponding to a lower part of the corresponding cross bar segment.

16. The keyboard according to claim 15, wherein:

a height that at least one second buffer block protrudes from the flexible circuit board is equal to a height that at least one first buffer block protrudes from the flexible circuit board, so that when the keycap is pressed, contact between the corresponding linkage rod and the at least one first buffer block and the at least one second buffer block is synchronous with contact between the reinforcing rod and the at least one second buffer block.

17. The keyboard according to claim 10, wherein:

the connecting rod comprises two linkage rods, and the two linkage rods are mirror-symmetrically disposed along a width-direction middle surface of the keycap;

each linkage rod comprises a cross bar segment and two rotary arm segments formed through bending and extending from two ends of the cross bar segment, and the cross bar segment of each linkage rod rotatably cooperates with the support plate by using the corresponding two rotary arm segments; and the buffer block comprises four first buffer blocks, the four first buffer blocks are rectangularly distributed, the four first buffer blocks respectively correspond to four bending portions, and each bending portion is a part of rod segments that are bent opposite to each other at a joint between the corresponding cross bar segment and the corresponding rotary arm segment.

18. The keyboard according to claim 17, wherein:

the connecting rod further comprises a reinforcing rod, and the reinforcing rod overall extends along a length direction of the keycap, and is fixedly connected to one side surface of the keycap facing the flexible circuit board; and a projection of the reinforcing rod on a first surface is located on an inner side of a rectangle enclosed by the four first buffer blocks; and the buffer block further comprises two second buffer blocks, and the two second buffer blocks are disposed at intervals from each other along the length direction of the keycap, and respectively correspond to two ends of the reinforcing rod along a length direction; and each second buffer block extends along a width direction parallel to the keycap to a position corresponding to a lower part of the corresponding cross bar segment.

* * * * *